US005506901A

United States Patent [19]
Reeder

[11] Patent Number: 5,506,901
[45] Date of Patent: Apr. 9, 1996

[54] CALL EAVESDROPPING ARRANGEMENT

[75] Inventor: Robert D. Reeder, Westminster, Colo.

[73] Assignee: AT&T Corp., Murray Hill, N.J.

[21] Appl. No.: 130,974

[22] Filed: Oct. 4, 1993

[51] Int. Cl.⁶ .............................. H04B 3/23; H04M 1/64
[52] U.S. Cl. ............................. 379/410; 379/67; 379/406
[58] Field of Search .............................. 379/67, 88, 89, 379/406, 410, 411; 370/32.1

[56] References Cited

U.S. PATENT DOCUMENTS

| 4,117,278 | 9/1978 | Ehrlich et al. | 179/175.2 C |
| 4,802,206 | 1/1989 | Yoshida et al. | 379/158 |
| 4,878,240 | 10/1989 | Lin et al. | 379/67 |
| 4,914,692 | 4/1990 | Hartwell | 379/410 |
| 5,054,021 | 10/1991 | Epps | 370/62 |
| 5,083,308 | 1/1992 | Gaulke et al. | 379/381 |
| 5,125,024 | 6/1992 | Gokcen | 379/410 |
| 5,199,062 | 3/1993 | Von Meister et al. | 379/67 |
| 5,327,489 | 7/1994 | Anderson et al. | 379/107 |
| 5,400,394 | 3/1995 | Raman | 370/32.1 |

FOREIGN PATENT DOCUMENTS

| 2520925 | 11/1976 | Germany | H04M 3/42 |
| 9215166 | 9/1992 | WIPO | H04M 1/64 |

OTHER PUBLICATIONS

S. D. Hester, et al., *The AT&T Multi—Mode Voice Systems—Full Spectrum Solutions for Speech Processing Applications*, Proceedings of the 1985 AVIOS Conference, Sep. 1985, pp. 1–10.

Primary Examiner—Jeffrey Hofsass
Assistant Examiner—Fan Tsang
Attorney, Agent, or Firm—David Volejnicek

[57] ABSTRACT

A switching system (10) is modified to provide, in addition to conventional connections (110+111) between ports (100, 103), eavesdropping connections that couple only one-half of a conventional bidirectional connection between a pair of ports to a third port (102). If the pair of ports serves an adjunct processor such as a voice-mail system (11) and a user voice terminal (13), a voice- or speech-recognition unit (12) serving the adjunct processor may be connected to the third terminal to receive thereat only the transmissions (112) of the user voice terminal without the unwanted transmissions of the adjunct processor. If the transmissions of the user voice terminal are polluted with echoes of the adjunct processor transmissions, then each half of the conventional connection between the adjunct processor and the user voice terminal may be connected to a different one of two ports (102, 103) serving the voice- or speech-recognition unit, whereby the recognition unit is able to receive the polluted transmissions (112) of the user terminal separately from the transmissions (113) of the adjunct processor and use the latter to perform echo cancelling functions on the former so as to obtain only the transmissions of the user voice terminal without the unwanted transmissions of the adjunct processor.

32 Claims, 2 Drawing Sheets

CALL EAVESDROPPING ARRANGEMENT

TECHNICAL FIELD

The invention relates generally to telecommunications switching systems, and specifically to such systems equipped with adjunct processors.

BACKGROUND OF THE INVENTION

Adjunct processors are commonly used with telecommunications switching systems to provide features and other capabilities that are not available from the switching system itself. An illustrative example of an adjunct processor is a voice messaging system that interacts with callers to provide a voice message-delivery service between calling and called parties.

A conventional way for a person to interact with an adjunct processor such as a voice messaging system is through his or her telephone keypad, which responds to the person's button presses by generating dual-tone multi-frequency (DTMF, also known as Touch-Tone) control signals and sending them to the adjunct processor. An unfortunate limitation of this user interface is that it requires the person to have a DTMF telephone. Consequently, the many persons who have traditional rotary-pulse telephones are excluded from obtaining the services of the adjunct processor.

A way to overcome this limitation is to equip the adjunct processor with a voice-or speech-recognition facility, which enables persons to interact with the adjunct processor through spoken commands. While such a facility may be built into newly-designed adjunct processors, it is often impractical, e.g., for cost reasons, to do so. And it is difficult to impossible to add such a facility to existing adjunct processors, in large measure because speech processing consumes large amounts of computing resources, which the adjunct processor normally cannot spare. Hence, it is preferable to provide the voice-or speech-recognition facility as a separate unit—as an adjunct processor to the adjunct processor.

Voice-or speech-recognition units are normally configured to terminate all input signals, not to terminate some (e.g., control commands) and to pass-through others (e.g., voice messages to be recorded). Consequently, without the use of additional circuit, a voice-or speech-recognition unit normally cannot be connected—either in series or in parallel—to the same switching system port as the adjunct processor which it is to sere. And while bridging, conferencing, or service observing arrangements which can connect a plurality of terminals (e.g., telephone station sets or adjunct processors) in parallel to a single call are known, they are not usable as conventionally implemented to connect a voice-or speech-recognition unit to the same call as an adjunct processor but at a different switching system port. This is because they normally feed to the receiver of the bridged, conferenced, or service-observing unit the combined output of all other units connected to the call. Consequently, they would combine both the caller's output signals and the adjunct processor's output signals on the same link or channel for input to the voice-or speech-recognition unit, making it impossible for this unit to determine the source of the input and hence to distinguish between the caller's control commands on the one hand and prompts and messages being played out by the adjunct processor on the other hand.

SUMMARY OF THE INVENTION

This invention is directed to solving these and other disadvantages of the prior art. Generally according to the invention, a switching system is modified to provide, in addition to conventional connections between ports, eavesdropping connections that couple only one-half of a conventional bidirectional connection between a pair of ports to a third port. If the pair of ports serves an adjunct processor such as a voice-mail system and a user voice terminal, a voice- or speech-recognition unit serving the adjunct processor may be connected to the third terminal to receive thereat only the transmissions of the user voice terminal without the unwanted transmissions of the adjunct processor. If the transmissions of the user voice terminal are polluted with echoes of the adjunct processor transmissions, then each half of the conventional connection between the adjunct processor and the user voice terminal may be connected to a different one of two ports serving the voice- or speech-recognition unit, whereby the recognition unit is able to receive the polluted transmissions of the user terminal separately from the transmissions of the adjunct processor and use the latter to perform echo cancelling functions on the former so as to obtain only the transmissions of the user voice terminal without the unwanted transmissions of the adjunct processor.

Specifically according to one aspect of the invention, in a switching system that has a plurality of communications ports and that functions to establish bidirectional connections between pairs of the ports to convey signals among the ports of individual pairs from a first port of a pair to a second port of the pair and from the second port of the pair to the first port of the pair, a determination is made that a unidirectional connection needs to be established between the first port of a pair of the ports having a bidirectional connection established therebetween, and a third port. The switching system is then caused to establish the needed unidirectional connection between the first port and the third port to convey signals from the first port to the third port without also conveying signals from the second port of the pair to the third port.

Specifically according to a second aspect of the invention, a determination is made in the above-characterized switching system that unidirectional connections need to be established between the first port of the pair and a third port and between the second port of the pair and a fourth port. The switching system is then caused to establish the needed connection between the first port and the third port to convey signals from the first port to the third port without also conveying signals from the second port to the third port, jointly with the needed connection between the second port and the fourth port to convey signals from the second port to the fourth port without also conveying signals from the first port to the fourth port.

By means of the arrangement characterized above, an adjunct processor such as a voice- or speech-recognition unit is able to interface a terminal, such as a voice messaging system, to a call while being connected to a different switching system port than the terminal. In program-controlled switching systems, the arrangement is typically simple and inexpensive to implement, ordinarily requiring only software changes to relatively small portions of the control software of either the switching system controller or a port-board controller, and no hardware modifications. For this reason, the arrangement is also readily retrofitted into existing switching systems.

These and other advantages and features of the invention will become more apparent from the following description of an illustrative embodiment of the invention considered together with the drawing.

DETAILED DESCRIPTION

Figure 1:
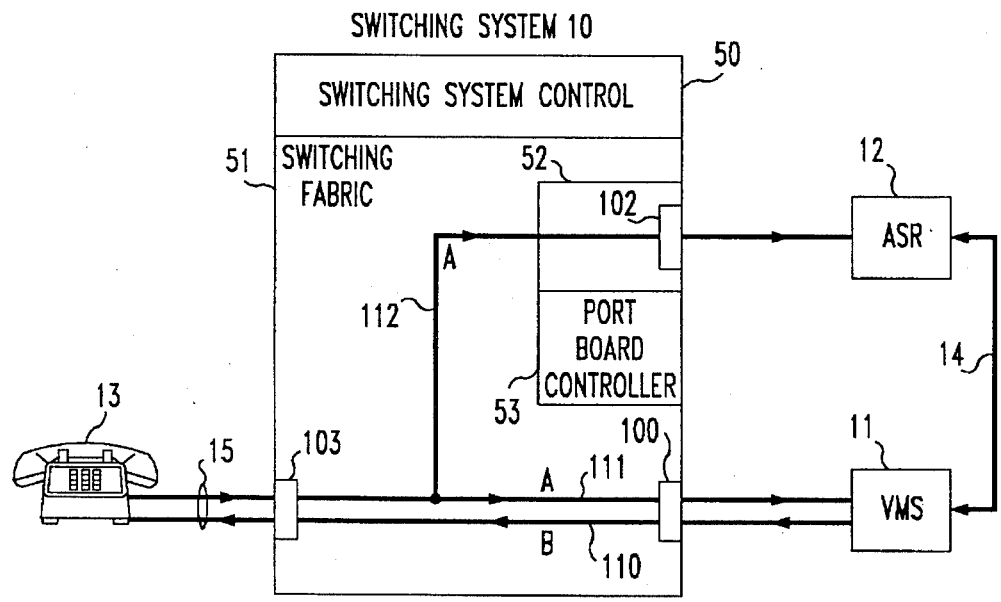
FIG. 1 is a block diagram of an all-digital telecommunications system that includes an illustrative embodiment of the invention.

FIG. 1 shows a rudimentary telecommunications system, comprising a switching system 10 that interconnects a plurality of terminals 11–13. Terminals 11–13 include adjunct processors such as a voice messaging system (VMS) 11 and an associated automatic voice- or speech-recognition unit (ASR) 12. Terminals 11–13 also include a telephone 13, here representative of all types of user telecommunication terminals. For simplicity of illustration, only one of a plurality of telephones 13 is shown, and other facilities (e.g., trunks leading to other switching systems) are omitted. By way of example, switching system 10 may be an AT&T Definity® private branch exchange (PBX), VMS 11 may be an AT&T Definity® Audix® VMS, and ASR 12 may be an AT&T Conversant® system equipped with a standard speech recognition option. Each terminal 11–13 is connected to a different associated at least one port 100, 102, and 103, respectively, of switching system 10. VMS 11 and ASR 12 are further interconnected by a data communications link 14, in a conventional manner. This connection is used, for example, by VMS 11 to indicate to ASR 12 which calls to eavesdrop on, when to perform its speech-recognition function on incoming speech, and when to ignore incoming speech, and by ASR 12 to inform VMS 11 of the results of its speech-recognition activities, such as the identity of recognized commands. Illustratively, link 14 may be an RS-232 link or a local area network (LAN).

Each port of switching system 10 is a single administrable entity—an atomically-allocatable resource for purposes of providing communications services. Conventionally, the connections of terminals to the ports of a switching system, and any connections between the ports that are established by the switching system, each defines a pair of unidirectional channels that carry communications in opposite directions. Thus, for example, a conventional connection established by switching system 10 between telephone 13 and VMS 11 defines a channel 100 which carries communications B generated and transmitted by VMS 11 to the receiver of telephone 13, and a channel 101 which carries communications A generated and transmitted by telephone 13 to the receiver of VMS 11.

Figure 2:
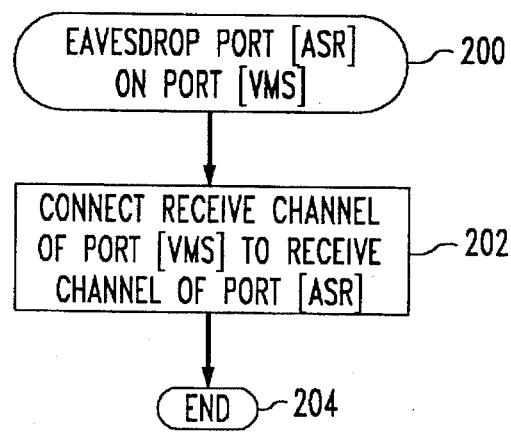
FIG. 2 is a flowchart of the establishment of an eavesdrop function in the switching system of the telecommunications system of FIG. 1.

It is assumed in FIG. 1 that telephone 13 and all facilities 15 forming the connection between telephone 13 and switching system 10 are digital, and therefore that communications A and B remain fully separated, flowing on separate channels, throughout the system of FIG. 1. In this system, ASR 12 must have access to channel 111 and does not need access to channel 110 in order for ASR 12 to perform speech recognition on communications A from telephone 13. This access is provided by switching system 10 by means of an eavesdrop facility, which connects channel 111 to the receive channel 112 of port 102 serving ASR 12. The formation of this facility is illustrated in FIG. 2.

The eavesdrop facility can be provided in various ways. For example, when switching system 10 connects VMS 11 to telephone 13, VMS 11 sends a command to control 50 of switching system 10 to eavesdrop ASR 12 on this connection. Alternatively, VMS 11 sends a message over link 14 to ASR 12 requesting ASR 12 to send a command to control 50 of switching system 10 to eavesdrop ASR 12 on the connection between VMS 11 and telephone 13. Or, upon establishing the connection between telephone 13 and VMS 11, control 50 of switching system 10 recognizes, from information administered for port 100, that port 102 is to eavesdrop onto that connection. In any event, control 50 of switching system 10 determines that port 102 serving ASR 12 needs to eavesdrop on port 100 serving VMS 11, at step 200 of FIG. 2. In response, control 50 causes switching fabric 51 of switching system 10 to connect the receive channel 111 of port 100 (which is the transmit channel of port 101) to the receive channel 112 of port 102, at step 202, and ends, at step 204. In the illustrative example of switching system 10 being an AT&T Definity PBX, wherein switching fabric 51 is a time-division multiplex (TDM) bus interconnecting all of the ports of switching system 10, step 202 is effected by way of control 50 commanding controller 53 of a port board 52 that includes port 102 to cause port 102 to listen (receive) on the same TDM bus timeslot as port 100.

Alternatively in this illustrative example, the eavesdrop facility may be implemented through a conventional command to control 50 of switching system 10, such as a bridging, conferencing, or service-monitoring command. Upon receipt of this command, control 50 commands controller 53 to cause port 102 to listen on the same two TDM bus timeslots as ports 100 and 103, and—for some of those commands—to talk (transmit) on the same time slots as ports 100 and 103. Controller 53 will have been reconfigured (e.g., reprogrammed) to convert the received command into an eavesdrop command, so that when it receives the command from control 50 of switching system 10, at step 200 of FIG. 2, it performs only the very first part of the "listen" portion of the received command and ignores the rest of the received command, at step 202. In any event, the result of the procedure of FIG. 2 is that ASR 12 eavesdrops on transmissions of telephone 13 to VMS 11, in the manner shown in FIG. 1.

Figure 3:
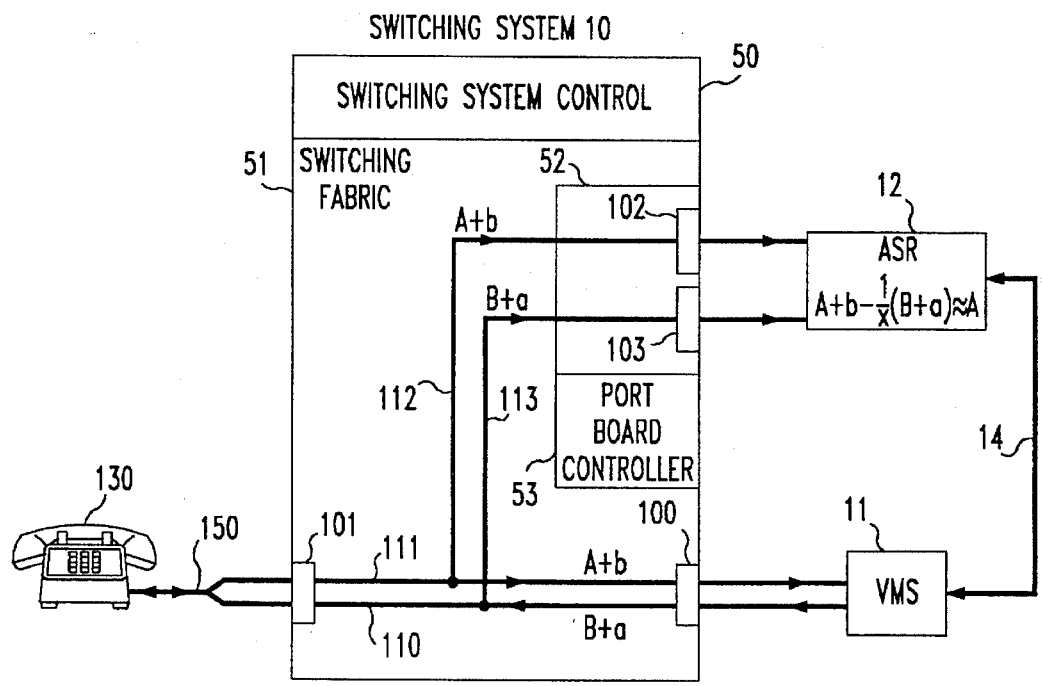
FIG. 3 is a block diagram of a partly-analog telecommunications system that includes an illustrative embodiment of the invention.

As was mentioned above, it is assumed in FIG. 1 that telephone 13 and all facilities forming the connection 15 between telephone 13 and switching system 10 are digital, and therefore that communications A and B remain fully separated, flowing on separate channels, throughout the system of FIG. 1. If, however, either the telephone or any facilities forming the connection between the telephone and switching system 10 are analog, it is likely that phenomena such as crosstalk and feedback will inject an attenuated copy, an echo, of the communications from one channel into the other channel. This scenario is illustrated in FIG. 3, which shows an analog phone 130 in place of digital phone 13 of FIG. 1 and an analog connection 150 in place of digital connection 15 of FIG. 1. Consequently, channel 111 is shown as carrying from port 101 the communication A generated and transmitted by phone 130 plus an echo b of the communication B generated and transmitted by VMS 11. And, analogously, channel 110 is shown as carrying from port 100 the communication B generated and transmitted by VMS 11 plus an echo a of the communication A generated and transmitted by telephone 130. In this scenario, ASR 12 must first perform an echo-cancellation function on the communication from telephone 130 so as to eliminate echo b and obtain the pure communication A for use by its speech-recognition function. The echo-cancellation function is represented in block 12 of FIG. 3 by the equation $$A + b - \frac{1}{x}(B + a) \approx A,$$

wherein $\frac{B}{x} = b$, and $\frac{a}{x} \to 0$.

Echo cancellation is well known in the art.

In order to be able to perform the echo-cancellation function, ASR 12 must receive the communications from both channels 111 and 110, so as to be able to subtract the latter from the former according to the equation given above. While conventional functions such as bridging, conferencing, and service monitoring would provide both communications, the problem is that they would provide the sum of those two communications on a single receive channel. This is not a form of the communications that ASR 12 can use. Therefore, the eavesdrop function must be used, modified from the form shown in FIG. 2 to the form shown in FIG. 4 to provide ASR 12 with the communications from channels 110 and 111 on separate receive channels. However, a conventional switching system port 102 accommodates only one receive channel. Therefore, in order to be able to receive two channels, ASR 12 must be connected to two conventional ports 102 and 103, as shown in FIG. 3.

Figure 4:
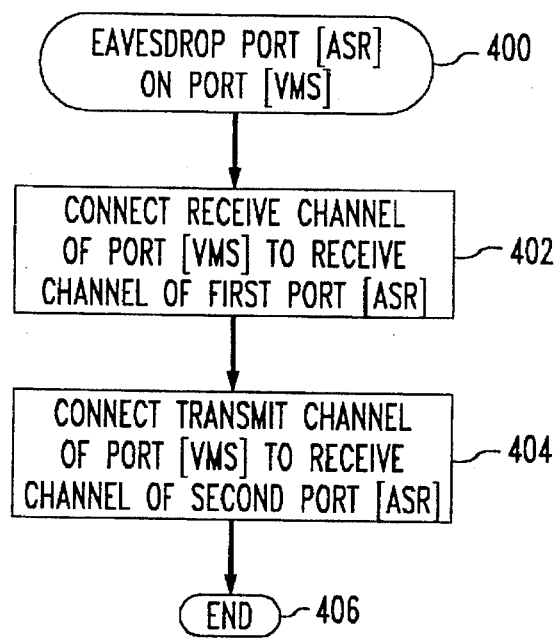
FIG. 4 is a flowchart of the establishment of an eavesdrop function in the switching system of the telecommunications system of FIG. 3.

Control 50 of switching system 10 determines that ports serving ASR 12 need to eavesdrop on port 100 serving VMS 11, at step 400 of FIG. 4, in one of the ways that were described for step 200 of FIG. 2. In response, control 50 causes switching fabric 51 of switching system 10 to connect the receive channel 111 of port 100 to the receive channel 112 of port 102, at step 402, and further to connect the transmit channel 110 of port 100 to the receive channel 113 of port 103, at step 404, and then ends, at step 406. In the illustrative example of switching system 10 being an AT&T Definity PBX, step 402 is effected by control 50 commanding controller 53 of a multi-port board 52 that includes ports 102 and 103 to cause port 102 to listen (receive) on the same TDM bus timeslot as port 100, and step 404 is effected by control 50 commanding controller 53 to cause port 103 to listen on the TDM bus timeslot that port 100 talks (transmits) on.

Alternatively in this illustrative example, the eavesdrop facility may be implemented through a conventional command to control 50 of switching system 10, such as a bridging, conferencing, or service-monitoring command. Upon receipt of this command, control 50 commands controller 53 of multi-port board 52 that includes ports 102 and 103 to cause port 102 to listen on the same two TDM bus timeslots as ports 100 and 101, and—for some of those commands—to talk on the same time slots as ports 100 and 101. Controller 53 of multi-port board 52 will have been reconfigured (e.g., reprogrammed) to convert the received command into an eavesdrop command, so that when it receives the command from control 50 of switching system 10, at step 400 of FIG. 4, it responds by causing ports 102 and 103 to separately listen to the time slots being listened on by ports 100 and 101, respectively, and ignoring the rest of the command, at steps 402 and 404. In any event, the result of the procedure of FIG. 4 is that ASR 12 eavesdrops on transmissions from both telephone 13 and VMS 11 via separate ports 102 and 103, in the manner shown in FIG. 3.

Of course, various changes and modifications to the illustrative embodiment described above will be apparent to those skilled in the art. For example, substantially any adjunct, terminal device, or other equipment may be used in place of the telephone and the voice mail system. Likewise, substantially any service providing equipment may be used in lieu of the automatic voice-or speech-recognition unit. Such changes and modifications can be made without departing from the spirit and the scope of the invention and without diminishing its attendant advantages. It is therefore intended that such changes and modifications be covered by the following claims.

I claim:

1. In a switching system having a plurality of communications ports, a switching fabric interconnecting the plurality of communications ports, and control means for establishing bidirectional switched connections in the switching fabric between pairs of the ports to convey signals among the ports of individual pairs through the switching fabric from a first port of a pair to a second port of the pair and from the second port of the pair to the first port of the pair, the improvement in the control means comprising:

means for establishing a unidirectional switched connection in the switching fabric between the first port of a pair of the ports having a bidirectional switched connection established therebetween, and a third port to convey signals from the first port to the third port through the switching fabric without also conveying signals from the second port of the pair to the third port through the switching fabric; and means for determining that a unidirectional switched connection needs to be established and causing the means for establishing a unidirectional switched connection to establish the needed unidirectional switched connection.

2. The improvement of claim 1 in a switching system wherein the bidirectional switched connections each comprises a pair of oppositely directed unidirectional switched communications channels between the pair of ports, wherein:

the means for establishing a unidirectional switched connection comprise means for establishing a switched connection consisting of a unidirectional switched communications channel from the first port to the third port.

3. The improvement of claim 1 in a switching system having the plurality of communications ports interconnected by a time-division multiplex (TDM) bus wherein the bidirectional switched connections each comprises a first TDM bus time slot transmitted by the first port of the pair and received by the second port of the pair and a second TDM bus time slot transmitted by the second port of the pair and received by the first port of the pair, wherein:

the means for establishing a unidirectional switched connection comprise means for causing the third port to receive only the first time slot and to not receive the second time slot.

4. In a switching system having a plurality of communications ports, a switching fabric interconnecting the plurality of communications ports, and control means for establishing bidirectional switched connections in the switching fabric between pairs of the ports to convey signals among the ports of individual pairs through the switching fabric from a first port of a pair to a second port of the pair and from the second port of the pair to the first port of the pair, the improvement in the control means comprising:

means for establishing at a same time both (a) a first unidirectional switched connection in the switching fabric between the first port of a pair of ports having a bidirectional switched connection established therebetween in the switching fabric and a third port to convey signals from the first port to the third port through the switching fabric without also conveying signals from the second port of the pair to the third port through the switching fabric, and (b) a second unidirectional switched connection in the switching fabric between the second port of the pair and a fourth port to convey signals from the second port to the fourth port through the switching fabric without also conveying signals from the first port of the pair to the fourth port through the switching fabric; and means for determining that a first and a second unidirectional switched connections need to be established and causing the means for establishing at a same time both a first and a second unidirectional switched connection to establish at the same time the needed first and second unidirectional switched connections.

5. The improvement of claim 4 in a switching system wherein the bidirectional switched connections each comprises a pair of oppositely directed unidirectional switched communications channels between the pair of ports, wherein:

the means for establishing at a same time both a first and a second unidirectional switched connection comprise means for establishing at the same time both a first switched connection consisting of a unidirectional switched communications channel from the first port to the third port and a second switched connection consisting of a unidirectional switched communications channel from the second port to the fourth port.

6. The improvement of claim 4 in a switching system having the plurality of communications ports interconnected by a time-division multiplex (TDM) bus wherein the bidirectional switched connections each comprises a first TDM bus time slot transmitted by the first port of the pair and received by the second port of the pair and a second TDM bus time slot transmitted by the second port of the pair and received by the first port of the pair, wherein:

the means for establishing at a same time both a first and a second unidirectional switched connection comprise means for causing the third port to receive only the first time slot and not receive the second time slot and causing the fourth port to receive only the second time slot and not receive the first time slot.

7. A telecommunications system comprising:

a switching fabric having a plurality of communications ports interconnected by said switching fabric;

a first terminal connected to a first one of the ports;

a second terminal connected to a second one of the ports;

a third terminal connected to a third one of the ports, for interfacing the first terminal to the second terminal; and control means for controlling the switching fabric and the ports and including means for establishing a bidirectional switched connection in the switching fabric between the first one and the second one of the ports to convey signals from the first terminal to the second terminal through the switching fabric and to convey signals from the second terminal to the first terminal through the switching fabric, and means responsive to establishment of the bidirectional switched connection, for establishing a unidirectional switched connection in the switching fabric between the first one and the third one of the ports to convey only signals from the first terminal to the third terminal through the switching fabric without also conveying signals from the second terminal to the third terminal through the switching fabric.

8. The system of claim 7 wherein:

the first terminal is a voice terminal;

the second terminal is an adjunct processor; and the third terminal is a voice recognition arrangement connected to the adjunct processor to provide voice recognition services to the adjunct processor.

9. The system of claim 7 wherein:

the bidirectional switched connection comprises a pair of oppositely directed switched communications channels between the first one and the second one of the ports, one channel for conveying signals from the first one of the ports to the second one of the ports and another channel for conveying signals from the second one of the ports to the first one of the ports; and the unidirectional switched connection consists of a switched communication channel from the first one of the ports to the third one of the ports for conveying only signals from the first one of the ports to the third one of the ports.

10. The system of claim 7 wherein entire said system is a digital system.

11. A telecommunications system comprising:

a switching fabric;

a plurality of communications ports interconnected by said switching fabric;

a first terminal connected to a first one of the ports;

a second terminal connected to a second one of the ports;

a third terminal connected to a third one and a fourth one of the ports, for interfacing the first terminal to the second terminal; and control means for controlling the switching fabric and the ports and including means for establishing a bidirectional switched connection in the switching fabric between the first one and the second one of the ports to convey signals from the first terminal to the second terminal through the switching fabric and to convey signals from the second terminal to the first terminal through the switching fabric, and means responsive to establishment of the bidirectional switched connection, for establishing both (a) first unidirectional switched connection in the switching fabric between the first one and the third one of the ports to convey only signals from the first terminal to the third terminal through the switching fabric without also conveying signals from the second terminal to the third terminal through the switching fabric, and (b) a second unidirectional switched connection in the switching fabric between the second one and the fourth one of the ports to convey only signals from the second terminal to the third terminal through the switching fabric without also conveying signals from the first terminal to the third terminal through the switching fabric.

12. The system of claim 11 wherein:

signals from the second terminal comprise signals generated by the second terminal;

signals from the first terminal comprise signals generated by the first terminal and an echo of signals generated by the second terminal; and the third terminal comprises echo-cancelling means that use the signals from the second terminal for cancelling the echo of the signals generated by the second terminal from the signals from the first terminal.

13. The system of claim 11 wherein
the first terminal is a voice terminal;
the second terminal is an adjunct processor;, and
the third terminal is a voice recognition arrangement connected to the adjunct processor to provide voice recognition services to the adjunct processor.

14. The system of claim 13 wherein
signals from the adjunct processor comprise signals generated by the adjunct processor;
signals from the voice terminal comprise signals generated by the voice terminal and an echo of signals generated by the adjunct processor, and
the voice recognition arrangement comprises echo-cancelling means that use the signals from the adjunct processor for cancelling the echo of the signals generated by the adjunct processor from the signals from the voice terminal.

15. The system of claim 11 wherein:
the bidirectional switched connection comprises a pair of oppositely directed switched communications channels between the first one and the second one of the ports, one channel for conveying signals from the first one of the ports to the second one of the ports and another channel for conveying signals from the second one of the ports to the first one of the ports;
the first unidirectional switched connection consists of a switched communication channel from the first one of the ports to the third one of the ports for conveying only signals from the first one of the ports to the third one of the ports; and
the second unidirectional switched connection consists of a switched communication channel from the second one of the ports to the fourth one of the ports for conveying only signals from the second one of the ports to the fourth one of the ports.

16. The system of claim 11 wherein at least a portion of said system is an analog system.

17. A method of operating a switching system having a plurality of communications ports, a switching fabric interconnecting the plurality of communications ports, and control means for establishing bidirectional switched connections in the switching fabric between pairs of the ports to convey signals among the ports of individual pairs through the switching fabric from a first port of a pair to a second port of the pair and from the second port of the pair to the first port of the pair, the method comprising the steps of:
determining that a unidirectional switched connection needs to be established between the first port of a pair of the ports having a bidirectional switched connection in the switching fabric established therebetween, and a third port; and
in response to the determination, the control means establishing the unidirectional switched connection in the switching fabric between the first port and the third port to convey signals from the first port to the third port through the switching fabric without also conveying signals from the second port of the pair to the third port through the switching fabric.

18. The method of claim 17 in a switching system wherein the bidirectional switched connections each comprises a pair of oppositely directed unidirectional switched communications channels between the pair of ports, wherein:
the step of establishing the unidirectional switched connection comprises the step of
establishing a switched connection consisting of a unidirectional switched communications channel from the first port to the third port.

19. The method of claim 17 in a switching system having the plurality of communications ports interconnected by a time-division multiplex (TDM) bus wherein the bidirectional switched connections each comprises a first TDM bus time slot transmitted by the first port of the pair and received by the second port of the pair and a second TDM bus time slot transmitted by the second port of the pair and received by the first port of the pair, wherein:
the step of establishing a unidirectional switched connection comprises the step of
causing the third port to receive only the first time slot and to not receive the second time slot.

20. A method of operating a switching system having a plurality of communications ports, a switching fabric interconnecting the plurality of communications ports, and control means for establishing bidirectional switched connections in the switching fabric between pairs of the ports to convey signals among the ports of individual pairs through the switching fabric from a first port of a pair to a second port of the pair and from the second port of the pair to the first port of the pair, the method comprising the steps of:
determining that unidirectional switched connections need to be established between the first port of a pair of ports having a bidirectional switched connection in the switching fabric established therebetween and a third port and between the second port of the pair and a fourth port; and
in response to the determination, the control means establishing at a same time both (a) a first unidirectional switched connection in the switching fabric between the first port and the third port to convey signals from the first port to the third port through the switching fabric without also conveying signals from the second port of the pair to the third port through the switching fabric, and (b) a second unidirectional switched connection in the switching fabric between the second port and the fourth port to convey signals from the second port to the fourth port through the switching fabric without also conveying signals from the first port of the pair to the fourth port through the switching fabric.

21. The method of claim 20 in a switching system wherein the bidirectional switched connections each comprises a pair of oppositely directed unidirectional switched communications channels between the pair of ports, wherein:
the step of establishing at a same time both a first and a second unidirectional switched connection comprises the step of
establishing at the same time both a first switched connection consisting of a unidirectional switched communications channel from the first port to the third port and a second switched connection consisting of a unidirectional switched communications channel from the second port to the fourth port.

22. The method of claim 20 in a switching system having the plurality of communications ports interconnected by a time-division multiplex (TDM) bus wherein the bidirectional switched connections each comprises a first TDM bus time slot transmitted by the first port of the pair and received by the second port of the pair and a second TDM bus time slot transmitted by the second port of the pair and received by the first port of the pair, wherein:

the step of establishing at a same time both a first and a second unidirectional switched connection comprises the step of causing the third port to receive only the first time slot and not receive the second time slot and causing the fourth port to receive only the second time slot and not receive the first time slot.

23. A method of operating a telecommunications system that includes a switching fabric, a plurality of communications ports interconnected by said switching fabric, control means for controlling the switching fabric and the ports, a first terminal connected to a first one of the ports, a second terminal connected to a second one of the ports, and a third terminal connected to a third one of the ports for interfacing the first terminal to the second terminal, the method comprising the steps of:

the control means establishing a bidirectional switched connection in the switching fabric between the first one and the second one of the ports to convey signals from the first terminal to the second terminal through the switching fabric and to convey signals from the second terminal to the first terminal through the switching fabric; and in response to establishment of the bidirectional switched connection, the control means establishing a unidirectional switched connection in the switching fabric between the first one and the third one of the ports to convey only signals from the first terminal to the third terminal through the switching fabric without also conveying signals from the second terminal to the third terminal through the switching fabric.

24. The method of claim 23 in a system wherein the first terminal is a voice terminal, the second terminal is an adjunct processor, and the third terminal is a voice recognition arrangement connected to the adjunct processor to provide voice recognition services to the adjunct processor.

25. The method of claim 23 wherein:

the step of establishing a bidirectional switched connection comprises the step of establishing a pair of oppositely directed switched communications channels between the first one and the second one of the ports, one channel for conveying signals from the first one of the ports to the second one of the ports and another channel for conveying signals from the second one of the ports to the first one of the ports; and the step of establishing a unidirectional switched connection consists of the step of establishing a switched communication channel from the first one of the ports to the third one of the ports for conveying only signals from the first one of the ports to the third one of the ports.

26. The method of claim 23 in an entirely digital system.

27. A method of operating a telecommunications system that includes a switching fabric, a plurality of communications ports interconnected by said switching fabric, control means for controlling the switching fabric and the ports, a first terminal connected to a first one of the ports, a second terminal connected to a second one of the ports, and a third terminal connected to a third one and a fourth one of the ports for interfacing the first terminal to the second terminal, the method comprising the steps of:

the control means establishing a bidirectional switched connection in the switching fabric between the first one and the second one of the ports to convey signals from the first terminal to the second terminal through the switching fabric and to convey signals from the second terminal to the first terminal through the switching fabric; and in response to establishment of the bidirectional switched connection, the control means establishing both (a) first unidirectional switched connection in the switching fabric between the first one and the third one of the ports to convey only signals from the first terminal to the third terminal through the switching fabric without also conveying signals from the second terminal to the third terminal through the switching fabric, and (b) a second unidirectional switched connection in the switching fabric between the second one and the fourth one of the ports to convey only signals from the second terminal to the third terminal through the switching fabric without also conveying signals from the first terminal to the third terminal through the switching fabric.

28. The method of claim 27 in a system wherein signals from the second terminal comprise signals generated by the second terminal and signals from the first terminal comprise signals generated by the first terminal and an echo of signals generated by the second terminal, the method further comprising the step of:

using the signals from the second terminal at the third terminal for cancelling the echo of the signals generated by the second terminal from the signals from the first terminal.

29. The method of claim 27 in a system wherein the first terminal is a voice terminal, the second terminal is an adjunct processor, and the third terminal is a voice recognition arrangement connected to the adjunct processor to provide voice recognition services to the adjunct processor.

30. The method of claim 29 in a system wherein signals from the adjunct processor comprise signals generated by the adjunct processor, signals from the voice terminal comprise signals generated by the voice terminal and an echo of signals generated by the adjunct processor, and the method further comprises the step of:

using the signals frown the adjunct processor at the voice recognition arrangement for cancelling the echo of the signals generated by the adjunct processor from the signals from the voice terminal.

31. The method of claim 27 system wherein:

the step of establishing a bidirectional switched connection comprises the step of establishing a pair of oppositely directed switched communications channels between the first one and the second one of the ports, one channel for conveying signals from the first one of the ports to the second one of the ports and another channel for conveying signals from the second one of the ports to the first one of the ports; and the step of establishing a first and a second unidirectional switched connection consists of the steps of establishing a switched communication channel from the first one of the ports to the third one of the ports for conveying only signals from the first one of the ports to the third one of the ports, and establishing a switched communication channel from the second one of the ports to the fourth one of the ports for conveying only signals from the second one of the ports to the fourth one of the ports.

32. The method of claim 27 in at least a partially analog system.

* * * * *